United States Patent Office 3,478,078
Patented Nov. 11, 1969

3,478,078
THERMOLYSIS OF ALKOXY DISILANES IN THE PRESENCE OF ALCOHOLS TO PROVIDE HYDROGEN-SUBSTITUTED ALKOXYMONOSILANES
William H. Atwell, Midland, Mich., assignor to Dow Corning Corporation, Midland, Mich., a corporation of Michigan
No Drawing. Filed Sept. 18, 1967, Ser. No. 668,652
Int. Cl. C07f 7/18; C09k 3/18
U.S. Cl. 260—448.8                                     5 Claims

ABSTRACT OF THE DISCLOSURE

Hydrogen-substituted alkoxymonosilanes are produced by heating alkoxy-containing disilanes at a preferred temperature of from 175° C. to 225° C. under neutral conditions and in the presence of an alcohol. Illustrative of the above process is the following:

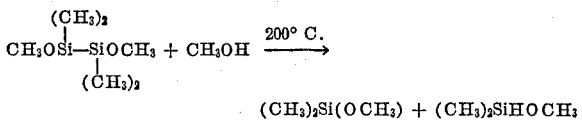

$$(CH_3)_2Si(OCH_3) + (CH_3)_2SiHOCH_3$$

The resulting alkoxymonosilanes, and particularly the hydrogen-substituted alkoxymonosilane, are useful as water repellents and can be employed as precursors in the production of other useful materials.

---

This invention relates to a process for producing hydrogen-substituted alkoxymonosilanes which comprises heating under neutral conditions, a disilane of the formula $$(RO)_n\underset{(CH_3)_{3-n}}{\overset{(CH_3)_{3-n}}{Si}}-Si(OR)_n$$

in which,

R is a lower alkyl radical containing from 1 to 6 carbon atoms inclusive, and n has a value of from 1 to 3 inclusive, in the presence of an alcohol of the formula ROH, in which R is a lower alkyl radical containing from 1 to 6 carbon atoms inclusive, thereafter recovering the desired hydrogen-substituted alkoxymonosilane.

As noted above, R can be any lower alkyl radical containing from 1 to 6 carbon atoms inclusive such as the methyl, ethyl, propyl, isopropyl, butyl, t-butyl, amyl, and hexyl radical. However, for purposes of the present invention, the methyl radical is to be preferred. For this reason, the obviously preferred alcohol is methanol, although ethanol, propanol, isopropanol, and butanol can be used. A temperature range of from 175° C. to 225° C. is to be preferred. The minimum temperature is not critical, however, for practical considerations and the like, the temperature must be sufficient, i.e., 175° C., so that the reaction will proceed at a feasible rate. If temperatures in excess of 225° C. are employed, undesirable side reactions may occur due to the redistribution of Si—H bonds and Si—OR bonds.

The fact that the process must be conducted under neutral conditions is to a certain extent critical. The term "neutral conditions" merely implies that there cannot be significant amounts of acid or alkali present. For example, if a significant amount of alkali is present it would initiate a redistribution of Si—Si bonds that would result in detrimental effects. However, it is of importance to note that traces of alkalinity which might be caused by the alkalinity of the glass apparatus in which the process is performed is not sufficiently significant to be deleterious.

Also, if a significant amount of acid is present, the alkoxy radical may be condensed; however, minor amounts of acids such as chlorosilanes can be tolerated as long as the acid is anhydrous and is not a catalyst for side reactions, i.e., the redistribution of Si—CH$_3$ bonds.

The process of the present invention must be conducted under essentially anhydrous conditions to prevent hydrolysis of the Si—OR bond. Both pressure and reaction time do not appear to be particularly critical.

Due to the nature of the thermal decomposition of the starting material (the alkoxy-containing disilanes), the formation of alkoxymonosilanes as well as the desired hydrogen-substituted alkoxymonosilanes occurs. It should be noted, however, that excessive reaction times are not desired since the yield of the hydrogen-substituted alkoxymonosilanes will decrease as the disilane is proportionately consumed. The hydrogen-substituted alkoxymonosilane is subsequently isolated by well known means, i.e., by standard distillation and the like.

The hydrogen-substituted alkoxymonosilane which is obtained is a particularly useful compound. Illustrative of the numerous uses to which the silane can be put is as a water repellent or as a precursor to produce other useful materials.

The following examples are merely illustrative and are not intended to limit the invention which is properly delineated in the appended claims.

EXAMPLE 1

Methanol and $(CH_3O)_3Si$—$Si(OCH_3)_3$ were mixed in a 1.5:1.0 mole ratio and heated in a closed system at a temperature of 200° C. The percent yield of $SiH(OCH_3)_3$ vs. the percent conversion of $(CH_3O)_3Si$—$Si(OCH_3)_3$ were determined periodically by quantitative gas-liquid-chromatography and the following results were obtained.

| Time (hrs.) | Yield (CH$_3$O)$_3$SiH, percent | Conversion (CH$_3$O)$_6$Si$_2$, percent |
|---|---|---|
| 1.0 | 79.8 | 64.4 |
| 2.0 | 68.0 | 87.7 |
| 3.0 | 71.7 | 95.5 |

EXAMPLE 2

The above procedure was repeated with the exception that a disilane of the formula

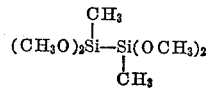

was employed. The following results were obtained.

| Time (hrs.) | Yield CH$_3$HSi(OCH$_3$)$_2$, percent | Conversion (CH$_3$O)$_4$Si$_2$(CH$_3$)$_2$, percent |
|---|---|---|
| 2.0 | 82.1 | 71.6 |
| 4.0 | 76.5 | 91.5 |
| 5.0 | 71.7 | 95.4 |

EXAMPLE 3

The above procedure was repeated with the exception that a disilane of the formula

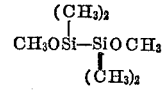

was employed. The following results were obtained.

| Time (hrs.) | Yield (CH$_3$)$_2$HSiOCH$_3$, percent | Conversion (CH$_3$O)$_2$Si$_2$(CH$_3$)$_4$, percent |
|---|---|---|
| 2.0 | 64.7 | 12.0 |
| 7.0 | 63.9 | 28.5 |
| 16.0 | 46.3 | 49.4 |

EXAMPLE 4

Substantially equivalent results were obtained when the reaction was conducted at a temperature of 225° C.

EXAMPLE 5

Substantially equivalent results were obtained when the alcohol employed was ethanol, propanol, isopropanol, or butanol.

That which is claimed is:

1. A process for producing hydrogen-substituted alkoxymonosilanes which comprises heating under neutral conditions, a disilane of the formula

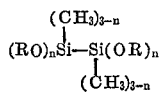

in which
R is a lower alkyl radical containing from 1 to 6 carbon atoms inclusive and $n$ has a value of from 1 to 3 inclusive,
in the presence of the alcohol of the formula ROH, in which
R is a lower alkyl radical containing from 1 to 6 carbon atoms inclusive, thereafter recovering the desired hydrogen-substituted alkoxymonosilane.

2. The process of claim 1 in which the temperature is within the range of from 175° C. to 225° C.

3. The process as recited in claim 1 in which the temperature is 200° C.

4. The process of claim 3 in which the disilane has the formula

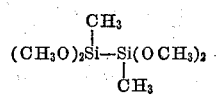

5. The process of claim 4 in which the alcohol is methanol.

References Cited

UNITED STATES PATENTS 2,881,197  4/1959  Kuriyagawa et al. __ 260—448.8
2,837,552  6/1958  George et al. _____ 260—448.8

OTHER REFERENCES

Kumada et al., J. Org. Chem., 21, November 1956, pp. 1264–1268.

TOBIAS E. LEOW, Primary Examiner

P. F. SHAVER, Assistant Examiner

U.S. Cl. X.R.

106—13